(12) United States Patent
Chen et al.

(10) Patent No.: US 6,910,726 B2
(45) Date of Patent: Jun. 28, 2005

(54) SUNSHADE FOR AUTOMOBILE'S WINDOW

(76) Inventors: Tung-Hsin Chen, No. 198, Sishih Rd., Yongkang City, Tainan County 710 (TW); Yih-Wenn Luo, 12F-4, No. 388, Jiun Ping Rd., An Ping Dist., Tainan City (TW)

( * ) Notice: Subject to any disclaimer, the term of this patent is extended or adjusted under 35 U.S.C. 154(b) by 0 days.

(21) Appl. No.: 10/657,489

(22) Filed: Sep. 8, 2003

(65) Prior Publication Data
US 2004/0079495 A1 Apr. 29, 2004

(30) Foreign Application Priority Data
Sep. 18, 2002 (TW) ........................................ 91215022 U

(51) Int. Cl.⁷ .................................................. B60J 3/00
(52) U.S. Cl. ................................ 296/97.9; 160/370.21; 160/368.1
(58) Field of Search ................................. 160/105, 106, 160/370.21, 368.1; 296/97.11, 97.1, 97.6, 97.4, 97.2, 97.9; D6/191

(56) References Cited

U.S. PATENT DOCUMENTS 5,622,215 A  *  4/1997  Lien ....................... 160/370.21

* cited by examiner

Primary Examiner—Blair M. Johnson
(74) Attorney, Agent, or Firm—Alan D. Kamrath; Nikolai & Mersereau, P.A.

(57) ABSTRACT

A substantially rectangular or square sunshade formed of a static adhesive material is releasably mounted on an automobile's window. The sunshade includes an elongated guide member along a lower edge thereof. The guide member is formed of relatively hard plastics. The guide member is concealed in a lengthwise groove in an intermediate portion of the automobiles doorframe when the window is closed. A predetermined gap is formed between the guide member and an adjacent intermediate edge of the doorframe so as to permit free passing of the guide member either through the lengthwise groove into an interior cavity of the doorframe or out of the interior cavity prior to being concealed in the lengthwise groove.

2 Claims, 3 Drawing Sheets

SUNSHADE FOR AUTOMOBILE'S WINDOW

BACKGROUND OF THE INVENTION

1. Field of the Invention

The present invention relates to sunshades and more particularly to an improved sunshade releasably adhered on an automobile's window.

2. Description of Related Art

A conventional sunshade has either a suction cup member or a static adhesive member so as to be releasably mounted on an automobile's window. However, the prior sunshade suffered from two disadvantages. For example, it may come off from the window when the window is moved down. Also, it may be stuck in an interior cavity of the doorframe when the window is moved up. Hence, a need for improvement exists.

SUMMARY OF THE INVENTION

It is an object of the present invention to provide a substantially rectangular or square sunshade formed of a static adhesive material being releasably mounted on an automobile's window. The sunshade comprises an elongated guide member along a lower edge thereof. The guide member is formed of relatively hard plastics and concealed in a lengthwise groove in an intermediate portion of the automobile's doorframe when the window is closed. A predetermined gap is formed between the guide member and an adjacent intermediate edge of the doorframe, so as to permit free passing of the guide member either through the groove into an interior cavity of the doorframe or out of the interior cavity prior to being concealed in the groove.

The above and other objects, features and advantages of the present invention will become apparent from the following detailed description taken with the accompanying drawings.

DETAILED DESCRIPTION OF THE PREFERRED EMBODIMENTS

Figure 1:
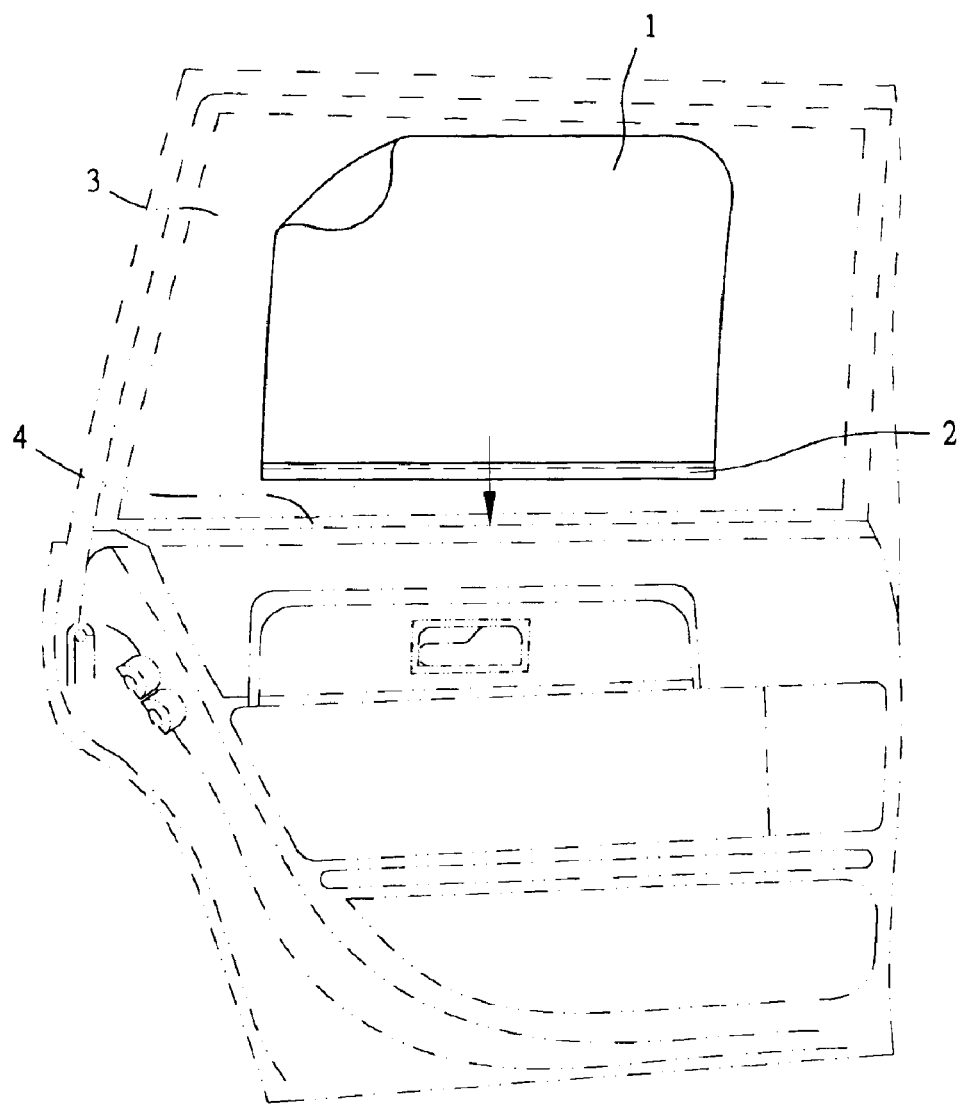
FIG. 1 is a side view of a sunshade adhered on a automobile's window according to the invention.
Figure 2:
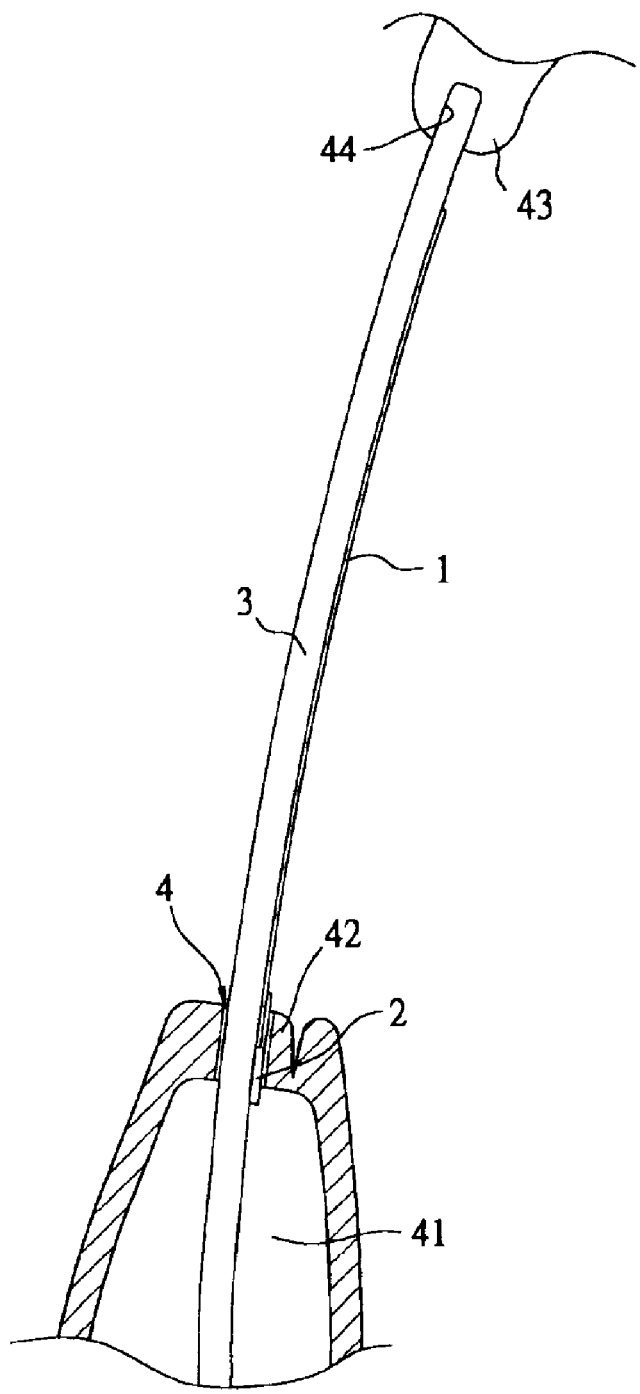
FIG. 2 is a cross-sectional view of the sunshade.

Referring to FIGS. 1 and 2, a sunshade constructed in accordance with the invention is indicated at 1. The sunshade 1 is formed of static adhesive material and is easily, releasably adhered on an automobile's window 3. The sunshade 1 is a substantially rectangular member and comprises an elongated guide member 2 along its lower edge. The guide member 2 is formed of relatively hard plastics. As shown in FIG. 2, the guide member 2 is substantially concealed in a lengthwise groove 4 in the intermediate portion of the automobile's doorframe when the window 3 is closed. A a predetermined gap exists between the guide member 2 and an adjacent intermediate edge 42 of the doorframe for permitting free passing of the guide member 2 through the groove 4 as detailed later. Also, the top edge of the sunshade 1 can be concealed in a lengthwise groove 44 in a top edge 43 of the doorframe in a closed position.

Figure 3:
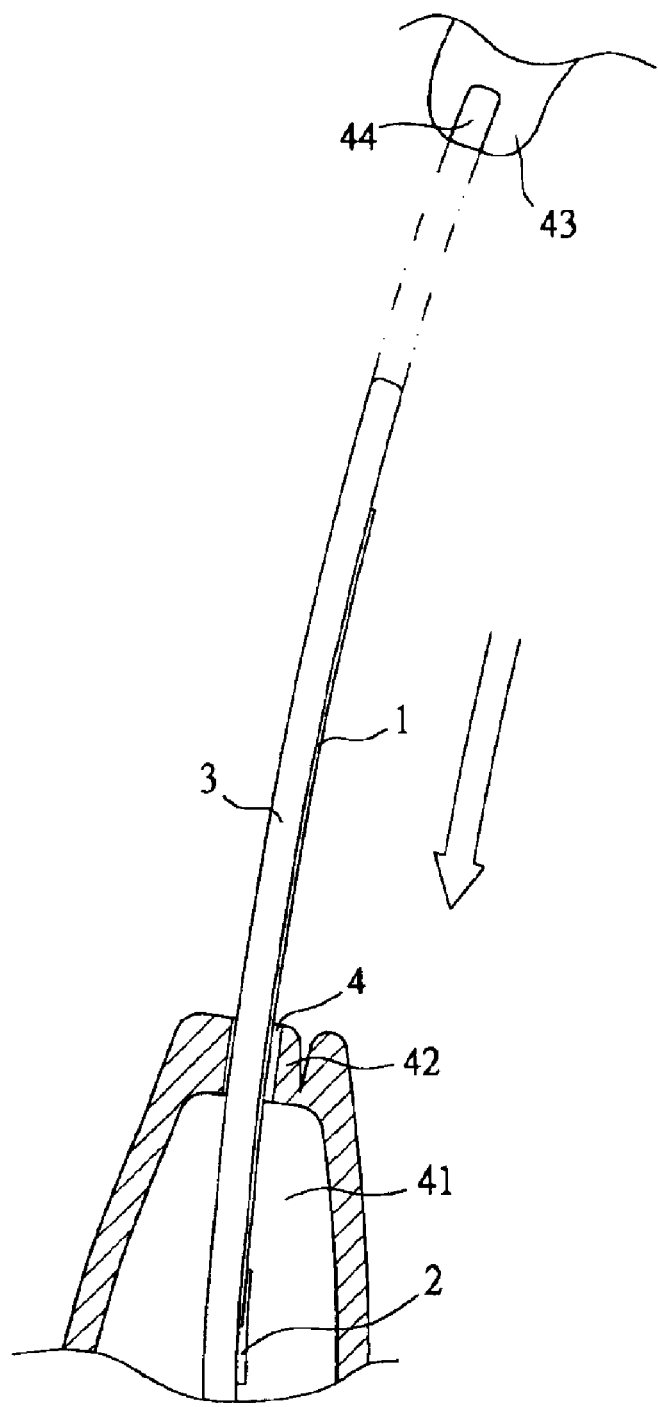
FIG. 3 is a view similar to FIG. 2, showing the window moving down.

Referring to FIG. 3, the sunshade 1 moves down into an interior cavity 41 of the doorframe without being interfered by the intermediate edge 42 when the window 3 is moving down. Free upward movement of the sunshade 1 including the guide member 2 without being interfered by the intermediate edge 42 and/or being stuck in the cavity 41 is also made possible.

While the invention herein disclosed has been described by means of specific embodiments, numerous modifications and variations could be made thereto by those skilled in the art without departing from the scope and spirit of the invention set forth in the claims.

What is claimed is:

1. An assembly comprising, in combination: an automobile doorframe having a window moveable between a closed position and an open position; a substantially rectangular or square sunshade formed of a static adhesive material being releasably mounted on the window of the automobile doorframe; and an elongated guide member engagement a lower edge of the static adhesive material, with the elongated guide member being formed of relatively hard plastics, and with the elongated guide member being received in a lengthwise groove in an intermediate portion of the automobile doorframe when the window is closed, with a predetermined gap being formed between the elongated guide member and an adjacent intermediate edge of the automobile doorframe so as to permit free passing of the guide member either through the longitudinal groove into an interior cavity of the automobile doorframe or out of the interior cavity prior to being concealed in the longitudinal groove.

2. The assembly of claim 1 with the static adhesive material and the elongated guide member each having a thickness from the window of the automobile doorframe, with the thickness of the elongated guide member being greater than the thickness of the static adhesive material, with the elongated guide member including an undercut slot of a thickness equal to and for receipt of the lower edge of the static adhesive material, with the elongated guide member further including a projecting portion extending over the undercut slot and the lower edge of the static adhesive material received in the undercut slot.

* * * * *